United States Patent
Lo et al.

(10) Patent No.: US 7,046,737 B2
(45) Date of Patent: May 16, 2006

(54) NEAR-OPTIMAL LOW-COMPLEXITY DECODING OF SPACE-TIME CODES FOR WIRELESS APPLICATIONS

(75) Inventors: Titus Lo, Redmond, WA (US); Vahid Tarokh, Madison, NJ (US)

(73) Assignee: Cingular Wireless II, LLC, Atlanta, GA (US)

( * ) Notice: Subject to any disclaimer, the term of this patent is extended or adjusted under 35 U.S.C. 154(b) by 91 days.

(21) Appl. No.: 10/838,553

(22) Filed: May 4, 2004

(65) Prior Publication Data

US 2004/0203547 A1 Oct. 14, 2004

Related U.S. Application Data

(63) Continuation of application No. 10/234,407, filed on Sep. 3, 2002, now Pat. No. 6,741,635, which is a continuation of application No. 09/690,542, filed on Oct. 17, 2000, now Pat. No. 6,470,043, which is a continuation of application No. 09/063,765, filed on Apr. 21, 1998, now Pat. No. 6,188,736.

(60) Provisional application No. 60/068,613, filed on Dec. 23, 1997.

(51) Int. Cl.
*H04B 7/02* (2006.01)
(52) U.S. Cl. .................................................. 375/267
(58) Field of Classification Search ............. 375/144, 375/147, 148, 267, 299, 346, 347, 341; 714/794
See application file for complete search history.

(56) References Cited

U.S. PATENT DOCUMENTS

| | | | |
|---|---|---|---|
| 3,633,107 A | 1/1972 | Brady | |
| 3,978,408 A | 8/1976 | Gupta et al. | |
| 4,001,692 A | 1/1977 | Fenwick et al. | |
| 4,099,121 A | 7/1978 | Fang | |
| 4,369,516 A | 1/1983 | Byrns | |
| 4,567,464 A | 1/1986 | Siegel et al. | |
| 4,577,332 A | 3/1986 | Brenig | |
| 4,675,880 A | 6/1987 | Davarian | |
| 4,733,402 A | 3/1988 | Monsen | |
| 4,763,331 A | 8/1988 | Matsumoto | |
| 4,953,183 A | 8/1990 | Bergmans et al. | |
| 5,022,053 A | 6/1991 | Chung et al. | |
| 5,029,185 A | 7/1991 | Wei | |

(Continued)

FOREIGN PATENT DOCUMENTS

CA 2252664 11/1997

(Continued)

OTHER PUBLICATIONS

Calderbank, A. et al., "Space-Time Codes for Wireless Communications," 1997 *IEEE ISIT* 1997, Jun. 29-Jul. 4, pp. 146, Ulm, Germany.

(Continued)

*Primary Examiner*—Don N. Vo
(74) *Attorney, Agent, or Firm*—Perkins Coie LLP

(57) ABSTRACT

An improved multi-antenna receiver is realized for detecting signals transmitted by a multi-antenna transmitter by summing signals received at the plurality of receiver antennas after multiplying each by a respective constant. The summed signal is applied to a maximum likelihood detector. The respective constants, $\lambda_j$, where j is an index designating a particular receiver antenna, are determined by evaluating the largest eigenvector of the matrix A, where Λ is a vector containing the values $\lambda_j$, and A is a matrix containing elements $\alpha_{ij}$, which is the transfer function between the $i^{th}$ transmitter antenna to the $j^{th}$ receiver antenna. The $\alpha_{ij}$ terms are determined in the receiver in conventional ways.

17 Claims, 2 Drawing Sheets

U.S. PATENT DOCUMENTS

| | | |
|---|---|---|
| 5,088,113 A | 2/1992 | Wei |
| 5,101,501 A | 3/1992 | Gilhousen et al. |
| 5,109,390 A | 4/1992 | Gilhousen et al. |
| 5,170,413 A | 12/1992 | Hess et al. |
| 5,202,903 A | 4/1993 | Okanoue |
| 5,283,780 A | 2/1994 | Schuchman et al. |
| 5,305,353 A | 4/1994 | Weerackody |
| 5,319,677 A | 6/1994 | Kim |
| 5,396,518 A | 3/1995 | How |
| 5,416,797 A | 5/1995 | Gilhousen et al. |
| 5,418,798 A | 5/1995 | Wei |
| 5,442,627 A | 8/1995 | Viterbi et al. |
| 5,457,712 A | 10/1995 | Weerackody |
| 5,461,646 A | 10/1995 | Anvari |
| 5,461,696 A | 10/1995 | Frank et al. |
| 5,479,448 A | 12/1995 | Seshadri |
| 5,481,572 A | 1/1996 | Skold et al. |
| 5,499,272 A | 3/1996 | Bottomley |
| 5,553,102 A | 9/1996 | Jasper et al. |
| 5,675,590 A | 10/1997 | Alamouti |
| 5,790,570 A | 8/1998 | Heegard et al. |
| 5,848,103 A | 12/1998 | Weerackody |
| 5,859,870 A | 1/1999 | Tsujimoto |
| 5,933,421 A | 8/1999 | Alamouti et al. |
| 5,943,372 A | 8/1999 | Gans et al. |
| 5,949,833 A | 9/1999 | Weerackody |
| 5,960,039 A | 9/1999 | Martin et al. |
| 5,991,331 A | 11/1999 | Chennankeshu et al. |
| 6,031,474 A | 2/2000 | Kay et al. |
| 6,034,987 A | 3/2000 | Chennankeshu et al. |
| 6,038,263 A | 3/2000 | Kotzin et al. |
| 6,088,408 A | 7/2000 | Calderbank et al. |
| 6,094,465 A | 7/2000 | Stein et al. |
| 6,097,771 A | 8/2000 | Foschini |
| 6,115,427 A | 9/2000 | Calderbank et al. |
| 6,144,711 A | 11/2000 | Raleigh et al. |
| 6,154,485 A | 11/2000 | Harrison |
| 6,173,005 B1 | 1/2001 | Kotzin et al. |
| 6,178,196 B1 | 1/2001 | Naguib et al. |
| 6,185,258 B1 | 2/2001 | Alamouti et al. |
| 6,185,266 B1 | 2/2001 | Kuchi et al. |
| 6,188,736 B1 | 2/2001 | Lo et al. |
| 6,298,082 B1 | 10/2001 | Harrison |
| 6,304,581 B1 | 10/2001 | Chen et al. |
| 6,317,411 B1 | 11/2001 | Whinnett et al. |
| 6,317,466 B1 | 11/2001 | Foschini et al. |
| 6,327,299 B1 | 12/2001 | Meszko |
| 6,377,631 B1 * | 4/2002 | Raleigh ..................... 375/299 |
| 6,393,074 B1 | 5/2002 | Mandyam et al. |
| 6,470,043 B1 | 10/2002 | Lo et al. |
| 6,501,803 B1 | 12/2002 | Alamouti et al. |
| 6,542,556 B1 | 4/2003 | Kuchi et al. |
| 6,549,585 B1 | 4/2003 | Naguib et al. |
| 6,741,635 B1 * | 5/2004 | Lo et al. ..................... 375/144 |

FOREIGN PATENT DOCUMENTS

| | | |
|---|---|---|
| CA | 2302289 | 3/1998 |
| CA | 2276207 | 2/2003 |
| DE | 298 24 760 U1 | 6/2002 |
| DE | 298 24 761 U1 | 6/2002 |
| DE | 298 24 762 U1 | 6/2002 |
| DE | 298 24 763 U1 | 6/2002 |
| DE | 298 24 765 U1 | 6/2002 |
| EP | 0 767 546 A2 | 4/1997 |
| EP | 1 016 228 B1 | 6/2003 |
| GB | 2 237 706 A | 8/1991 |
| GB | 2 280 575 A | 2/1995 |
| GB | 2 290 010 A | 12/1995 |
| GB | 2 311 445 A | 9/1997 |
| JP | 63-286027 A | 11/1998 |
| WO | WO 91/20142 A1 | 12/1991 |
| WO | WO 95/22214 A1 | 8/1995 |
| WO | WO 97/24849 A | 7/1997 |
| WO | WO 97/41670 A | 11/1997 |
| WO | WO 98/09385 | 3/1998 |
| WO | WO 99/14871 A | 3/1999 |
| WO | WO 00/11806 A1 | 3/2000 |
| WO | WO 00/18056 A1 | 3/2000 |
| WO | WO 00/49780 A1 | 8/2000 |
| WO | WO 00/51265 A1 | 8/2000 |
| WO | WO 01/19013 A1 | 3/2001 |
| WO | WO 01/54305 A1 | 7/2001 |
| WO | WO 01/56218 A1 | 8/2001 |
| WO | WO 01/63826 A1 | 8/2001 |
| WO | WO 01/69814 A1 | 9/2001 |

OTHER PUBLICATIONS

Hiroike et al., "Combined Effects of Phase Sweeping Transmitter Diversity and Channel Coding," *IEEE Transactions on Vehicular Technology*, vol. 41, No. 2, May, 1992, pp. 170-176, The Institute of Electrical and Electronics Engineers, Inc., New York, NY.

Naguib, A. F. et al., "Space-Time Coded Modulation for High Data Rate Wireless Communications," 1997 *IEEE*, pp. 102-109, 0-7803-4198-Aug. 1997, The Institute of Electrical and Electronics Engineers, Inc., New York, NY.

Alamouti, Siavash M., "A Simple Transmit Diversity Technique for Wireless Communications," *IEEE Journal on Select Areas in Communications*, Oct. 1998, pp. 1451-1458, vol. 16, No. 8, The Institute of Electrical and Electronics Engineers, Inc., New York, NY.

Blanco, M.A. et al., "On the Optimization of Simple Switched Diversity Receivers," 1978 IEEE Conference on Communications and Power, Montreal, Canada, pp. 114-117, (1978).

Blanco, M.A. et al., "Performance and Optimization of Switched Diversity Systems for the Detection of Signals with Rayleigh Fading," *IEEE Transactions on Communications*, 27(12):1887-1895, (Dec. 1979).

Cavers, James K., "An Analysis of Pilot Symbol Assisted Modulation for Rayleigh Fading Channels," *IEEE Transactions on Vehicular Technology*, Nov. 1991, pp. 686-693, vol. 40, No. 4, The Institute of Electrical and Electronics Engineers, Inc., New York, NY.

Foschini, G.J. et al., "On Limits of Wireless Communications in a Fading Environment when Using Multiple Antennas," *Wireless Personal Communications* 6:311-335, (1998).

Foschini, G.J., "Layered Space-Time Architecture for Wireless Communication in a Fading Environment when Using Multi-Element Antennae", *Bell Technical Labs Journal*, pp. 41-59, (1996).

Hinderling, J. et al., "CDMA Mobile Station Modem ASIC," *IEEE 1992 Custom Integrated Circuits Conference* pp. 10.2.1-10.2.5, (1992).

Kerr, R. et al., "The CDMA Digital Cellular System: An ASIC Overview," *IEEE 1992 Custom Integrated Circuits Conference* pp. 10.1.1-10.1.7, (1992).

Naguib, Ayman et al., "A Space-Time Coding Modem for High-Data-Rate Wireless Communications," *IEEE Journal On Selected Areas in Communications*, Oct. 1998, pp. 1459-1478, The Institute of Electrical and Electronics Engineers, Inc., New York, NY.

Pikhotz, R.L. et al., "Theory of Spread Spectrum Communications—A Tutorial," *IEEE Transactions on Communications*, 30(5):857-884, (1992).

Sampei, Seiichi et al., "Rayleigh Fading Compensation Method for 16QAM in Digital Land Mobile Radio Channels," *Proceeding of the 1989 IEEE Vehicular Technology Conference*, May 1989, pp. 640-646, The Institute of Electrical and Electronics Engineers, Inc., New York, NY.

Seshadri, N. et al., "Advanced Techniques for Modulation, Error Correction, Channel Equalization and Diversity," *AT&T Tech. Journal* 47(4): 48-63, Jul. 1993.

Seshadri, N. et al., "Space-Time Codes for Wireless Communication: Code Construction," IEEE 47th Vehicular Technology Cont., Phoenix, pp. 637-641, May 1997.

Seshadri, N. et al., "Two Signaling Schemes for improving the Error Performance of Frequency Division Duplex Transmission Using Transmitter Antenna Diversity," *International Journal of Wireless Information Networks*, 1(1):49-60, (1994).

Tarokh, V. et al., "Space Time Codes for High Data Rate Wireless Communication: Performance Criteria in the Presence of Channel Estimation Errors, Mobility, and Multiple Paths", *IEEE Transactions on Communcations* 47(2):199-207, (1999).

Tarokh, V. et al., "Space-Time Codes for High Data Rate Wireless Communication: Performance Criteria and Code Construction", *IEEE Trans Info Theory* vol. 44, (Mar. 1998).

Tarokh, V., et al., "Space-Time Codes for High Data Rate Wireless Communication: Performance Criteria," IEEE International Conference on Communications, Montreal, 1:299-303, Jun. 1997.

Tarokh, Vahid et al., "Combined Array Processing and Space-Time Coding," *IEEE Transactions on Information Theory*, May 1999, pp. 1121-1128, vol. 45, No. 4, The Institute of Electrical and Electronics Engineers, Inc., New York, NY.

Ungerboeck, Gottfried, "Channel Coding with Multilevel/Phase Signals," *IEEE Transactions on Information Theory*, Jan. 1982, pp. 55-67, vol. IT-28, No. 1, The Institute of Electrical and Electronics Engineers, Inc., New York, NY.

Weerackody, V., "Diversity for the Direct-Sequence Spread Spectrum System Using Multiple Transmit Antennas," Proceedings of the IEEE International Conference on Communications, May 23-26, 1993, Geneva, vol. 3, pp. 1775-1779.

Winters, J., "The Diversity Gain of Transmit Diversity in Wireless System with Rayleigh Fading", *AT&T Bell Laboratories New Orleans Supercomm ICC* pp. 1121-1125, (May 1994).

Winters, J.H., Salz, J., Gitlin, R.D., "The Impact of Antenna Diversity on the Capacity of Wireless Communications Systems," IEEE Transactions on Communications, vol. 42, No. 2, Feb./Mar./Apr. 1994, pp. 1740-1751, IEEE Communications Society, New York.

Wittneben, A., "A New Bandwidth Efficient Transmit Antenna Modulation Diversity Scheme for Linear Digital Modulation," *Proc. IEEE ICC* pp. 1630-1634, (1993).

Wittneben, A., "BaseStation Modulation Diversity for Digital Simulcast," *Proc. IEEE VTC*, pp. 848-853, (May 1991).

* cited by examiner

NEAR-OPTIMAL LOW-COMPLEXITY DECODING OF SPACE-TIME CODES FOR WIRELESS APPLICATIONS

REFERENCE TO RELATED APPLICATIONS

This application is a continuation of U.S. patent application Ser. No. 10/234,407, filed Sep. 3, 2002, now U.S. Pat. No. 6,741,635 which is a continuation of U.S. patent application Ser. No. 09/690,542, filed Oct. 17, 2000 (now U.S. Pat. No. 6,470,043), which is a continuation of U.S. patent application Ser. No. 09/063,765, filed Apr. 21, 1998 (now U.S. Pat. No. 6,188,736), which claims the benefit of U.S. Provisional Application No. 60/068,613, filed Dec. 23, 1997.

BACKGROUND OF THE INVENTION

This invention relates to wireless systems and, more particularly, to systems having more than one antenna at the receiver and at the transmitter.

Physical constraints as well as narrow bandwidth, co-channel interference, adjacent channel interference, propagation loss and multi-path fading limit the capacity of cellular systems. These are severe impairments, which liken the wireless channel to a narrow pipe that impedes the flow of data. Nevertheless, interest in providing high speed wireless data services is rapidly increasing. Current cellular standards such as IS-136 can only provide data rates up to 9.6 kbps, using 30 kHz narrowband channels. In order to provide wideband services, such as multimedia, video conferencing, simultaneous voice and data, etc., it is desirable to have data rates in the range of 64–144 kbps.

Transmission schemes for multiple antenna systems may be part of a solution to the problem of the currently available low data rates. Such schemes were first proposed in papers by Wittneben, and by Seshadri and Winters, where the problem was addressed in the context of signal processing.

One prior art arrangement having a single transmitter antenna and multiple receiver antennas is shown in FIG. 1. Each of the receiver antennas receives the transmitted signal via a slightly different channel, where each channel i is characterized by transfer function $\alpha_i$. Using an approach known as "Maximum Ratio Combining", the prior art approach to detection contemplates multiplying each received signal that had been influenced by $\alpha_i$ by the complex conjugate signal, $\alpha_i^*$, summed, and then processed.

In a co-pending application titled "Method and Apparatus for Data Transmission Using Space-Time Codes and Multiple Transmit Antennas", filed on May 6, 1997, bearing the Ser. No. 08/847,635, and assigned to the assignee of this invention, a coding perspective was adopted to propose space-time coding using multiple transmit and receive antennas. Space-time coding integrates channel coding, modulation, and multiple transmit antennas to achieve higher data rates, while simultaneously providing diversity that combats fading. It may be demonstrated that adding channel coding provides significant gains over the schemes of Wittneben and Seshadri and Winters. In said co-pending application, space-time codes were designed for transmission using 2–4 transmit antennas. These codes perform extremely well in slowly varying fading environments (such as indoor transmission media). The codes have user bandwidth efficiencies of up to 4 bits/sec/Hz which are about 3–4 times the efficiency of current systems. Indeed, it can be shown that the designed codes are optimal in terms of the trade-off between diversity advantage, transmission rate, decoding complexity and constellation size.

It can also be shown that as the number of antennas is increased, the gain increases in a manner that is not unlike a multi-element antenna that is tuned to, say, a particular direction. Unfortunately, however, when maximum likelihood detection is employed at the receiver, the decoding complexity increases when the number of transmit and receive antennas is increased. It would be obviously advantageous to allow a slightly sub-optimal detection approach that substantially reduces the receiver's computation burden.

SUMMARY

Such an approach is achieved with a receiver arrangement where signals received at a plurality of antennas are each multiplied by a respective constant and then summed prior to being applied to a maximum likelihood detector. The respective constants, $\lambda_j$ where j is an index designating a particular receiver antenna, are derived from a processor that determines the largest eigenvector of the matrix A, where $\Lambda$ is a vector containing the values $\lambda_j$, and A is a matrix containing elements $\alpha_{ij}$, which is the transfer function between the $i^{th}$ transmitter antenna to the $j^{th}$ receiver antenna. The $\alpha_{ij}$ terms are determined in the receiver in conventional ways.

DETAILED DESCRIPTION

Figure 1:
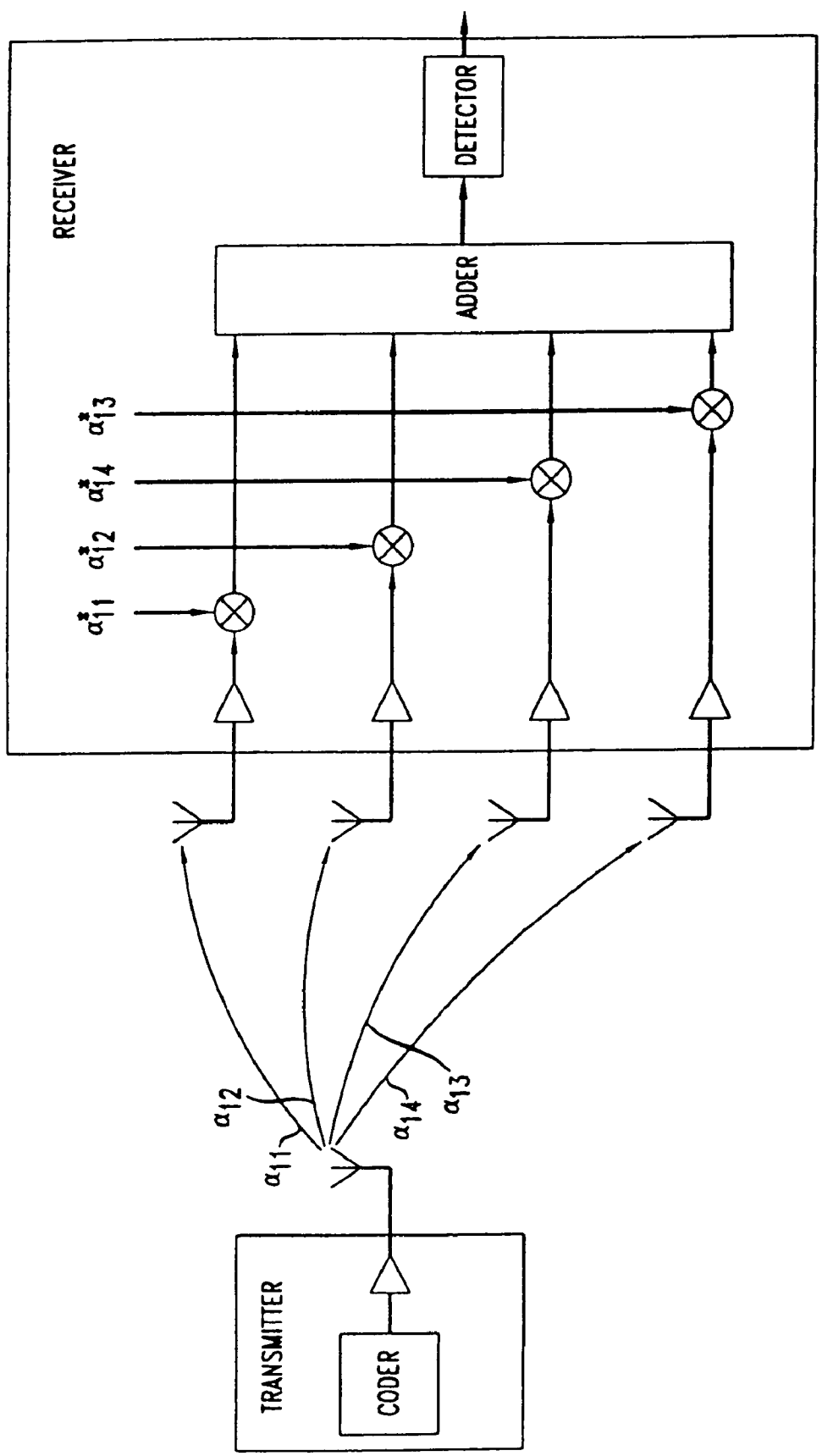
FIG. 1 presents a block diagram of prior Maximal Ratio Combining detection.
Figure 2:
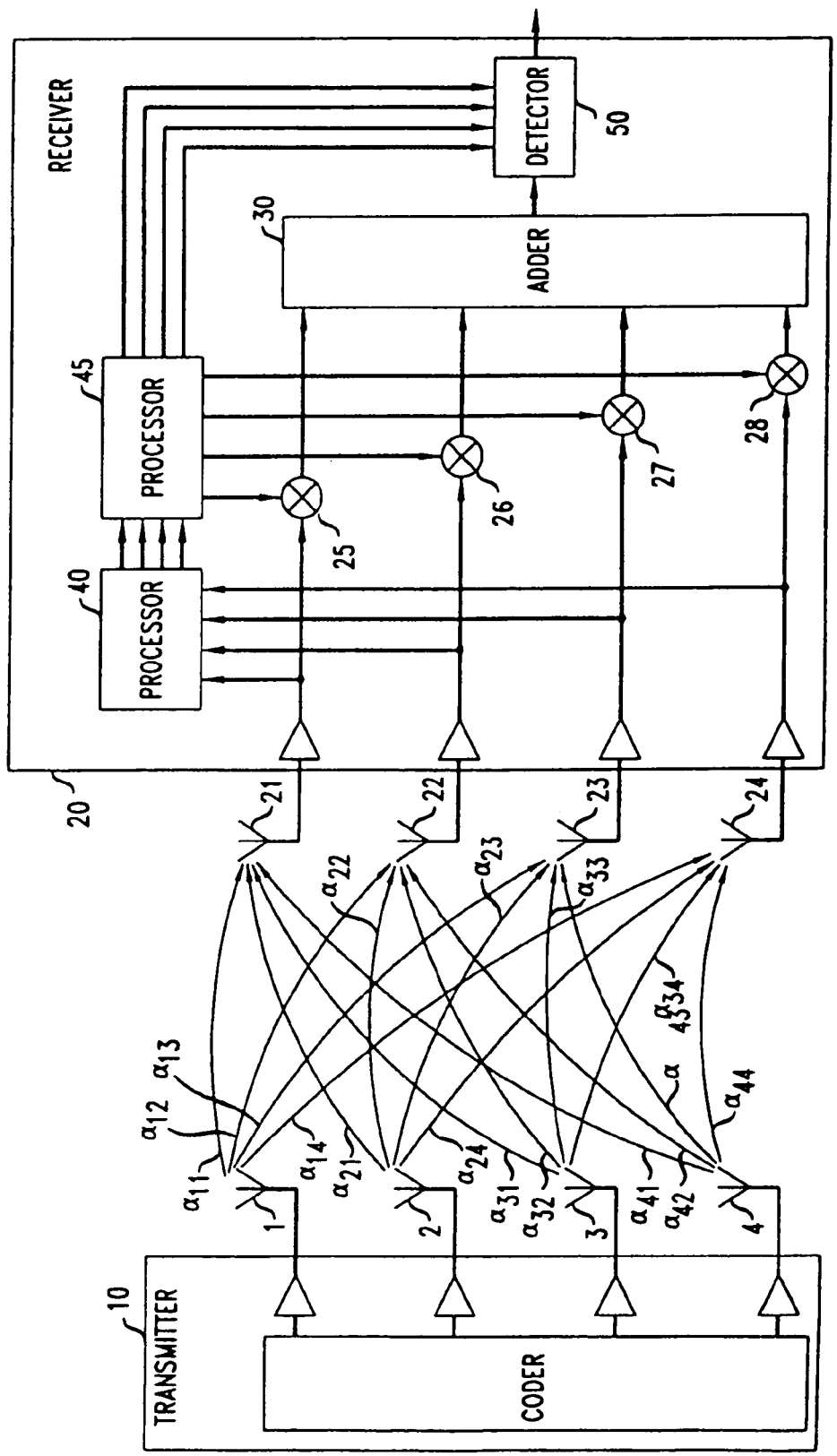
FIG. 2 presents a block diagram of an embodiment including a transmitter having a plurality of antennas, and a receiver having a plurality of antennas coupled to an efficient detection structure.

FIG. 2 presents a block diagram of a receiver in accord with an embodiment of the invention. It includes a transmitter 10 that has an n plurality of transmitting antenna 1, 2, 3, 4, and a receiver 20 that has an m plurality of receiver antennas 21, 22, 23, 24. The signals received by the receiver's antennas are multiplied in elements 25, 26, 27, and 28, and summed in adder 30. More specifically, the received signal of antenna j is multiplied by a value, $\lambda_j$, and summed. The collection of factors $\lambda_j$ can be viewed as a vector $\Lambda$. The outputs of the receiver antennas are also applied to processor 40 which, employing conventional techniques, determines the transfer functions $\alpha_{ij}$ for i=1, 2, 3, . . . , n and j=1, 2, 3, . . . , m. These transfer functions can be evaluated, for example, through the use of training sequences that are sent by the different transmitter antennas, one antenna at a time.

The evaluated $\alpha_{ij}$ signals of processor 40 are applied to processor 45 in FIG. 2 where the multiplier signals $\lambda_j$, j=1, 2, 3, . . . , m are computed. Processor 45 also evaluates a set of combined transfer function values $y_i$, i=1, 2, 3, . . . , n (which are described in more detail below). Signals $y_i$ of processor 45 and the output signal of adder 30 are applied to detector 50 which detects the transmitted symbols in accordance with calculations disclosed below.

It is assumed that the symbols transmitted by the antennas of transmitter 10 have been encoded in blocks of L time frames, and that fading is constant within a frame. A codeword comprises all of the symbols transmitted within a frame, and it corresponds, therefore, to $$c_1^1 c_1^2 c_1^3 \ldots c_1^4 c_2^1 c_2^2 c_2^3 \ldots c_2^4 c_3^1 c_3^2 c_3^3 \ldots c_3^4 \ldots c_m^1 c_m^2 c_m^3 \ldots c_m^4, \quad (1)$$

where the superscript designates the transmitter's antennas and the subscript designates the time of transmission (or position within a frame).

From the standpoint of a single transmitting antenna, e.g., antenna 1, the signal that is received from antenna 1 in response to a transmitted symbol $c_t^1$ at time interval t is:

$$R_t = c_t^1 (\alpha_{11}\lambda_1 + \alpha_{12}\lambda_2 + \alpha_{13}\lambda_3 + \ldots + \alpha_{1m}\lambda_m) \quad (2)$$
$$= c_t^1 \sum_{j=1}^{m} \lambda_j \alpha_{1j}$$
$$= c_t^1 \gamma_1$$

(when noise is ignored). If each $\lambda_j$ value is set to $\alpha^*_{1j}$, (where $\alpha^*_{1j}$ is the complex conjugate of $\alpha_{1j}$) then the received signal would simply be $$R_t = c_t^1 \sum_{j=1}^{m} |\alpha_{1j}|^2 \quad (3)$$

yielding a constructive addition.

Of course, the values of $\lambda_j$ cannot be set to match $\alpha^*_{1j}$ and concurrently to match the values of $\alpha^*_{ij}$ where i≠1; and therein lies the difficulty.

When all n of the transmitting antennas are considered, then the received signal is $$R_t = \sum_{i=1}^{n} \left( c_t^i \sum_{j=1}^{m} \lambda_j \alpha_{ij} \right) \quad (4)$$
$$= \sum_{i=1}^{n} c_t^i \gamma_i$$

In accordance with the present disclosure, the objective is to maximize $$\sum_{i=1}^{n} |\gamma_i|^2$$

because by doing so, signal $R_t$ contains as much information about $c_t^i$, i=1, 2, 3, . . . n as is possible. However, it can be easily shown that if a matrix A is constructed such that $$A = \sum_{i=1}^{n} (\Omega_i^*)^T \Omega_i, \quad (5)$$

where $\Omega_i = (\alpha_{i1}, \alpha_{i2}, \alpha_{i3} \ldots \alpha_{im})$, then $$\sum_{i=1}^{n} |\gamma_i|^2 = \Lambda A (\Lambda^*)^T. \quad (6)$$

The receiver, thus, has to maximize $\Lambda A(\Lambda^*)^T$, subject to the constraint $\|\Lambda\|^2=1$. The solution to this problem is to choose $\Lambda$ to be the eigenvector of A which corresponds to the maximum eigenvalue of A. Accordingly, processor 45 develops the matrix A from the values of $\alpha_{ij}$, finds the eigenvalues of A in a conventional manner, selects the maximum eigenvalue of A, and creates the vector A. Once $\Lambda$ is known, processor 45 develops signals $\gamma_i$ for 1=1, 2, 3, . . . , n, (where $$\gamma_i = \sum_{j=1}^{m} \lambda_j \alpha_{ij}),$$

and applies them to detector 50. Finally, detector 50 minimizes the metric $$\sum_{t=1}^{L} \left| R_t - \sum_{i=1}^{n} \gamma_i c_t^i \right|^2$$

from amongst all possible codewords in a conventional manner. As can be seen, this approach reduces the complexity of decoding by almost a factor of m.

FIG. 2 depicts separate multipliers to multiply received signals by multiplication factors $\lambda_i$, and it depicts separate blocks for elements 30,40,45, and 50. It should be understood, however, that different embodiments are also possible. For example, it is quite conventional to incorporate all of the above-mentioned elements in a single special purpose processor, or in a single stored program controlled processor (or a small number of processors). Other modifications and improvements may also be incorporated, without departing from the spirit and scope of the invention, which is defined in the following claims.

We claim:

1. A method of detecting symbols transmitted wirelessly from n number of transmitting antennas, the method comprising:

receiving transmitted signals from the n number of transmitting antennas by an m number of receiving antennas;

determining transfer functions $\alpha_{ij}$ for each wireless data channel by processing the received signals, wherein each wireless data channel is a path from one transmitting antenna to one receiving antenna;

forming an n×m matrix A, wherein the channel transfer functions $\alpha_{ij}$ represent elements of the matrix A;

finding an eigenvector $\Lambda$ associated with a maximum eigenvalue of matrix A, wherein $\lambda_j$ represent m elements of the eigenvector $\Lambda$;

computing S, wherein S is an inner product of the eigenvector $\Lambda$ and a vector whose element $\xi_j$ is the signal received by the $j^{th}$ receiving antenna;

computing $\gamma_i$'s, wherein $\gamma_i$ is an inner product of a $i^{th}$ row of the A matrix and the eigenvector $\Lambda$; and detecting the transmitted symbols, utilizing $\gamma_i$'s and S under a maximum likelihood detection scheme.

2. The method of claim 1, wherein the transmitting antennas transmit encoded symbols in blocks of multiple time frames, and wherein a codeword comprises all encoded symbols transmitted within a time frame.

3. The method of claim 1, wherein the wireless signal transmitted by the transmitting antennas is encoded under a space-time modulation scheme.

4. A system of processing wireless transmitted data, the system comprising:
   m number of transmitting antenna;
   n number of receiving antenna;
   at least one channel estimator;
   at least one processor;
   a maximum likelihood detector;
   wherein, under the system:
      each receiving antenna receives signals from the m transmitting antennas;
      the at least one channel estimator, utilizing the received signals, determines a transfer function of each data path from each transmitting antenna to each receiving antenna;
      the at least one processor determines an eigenvector $\Lambda$ associated with a maximum eigenvalue of a matrix A, wherein the transfer functions represent elements of the matrix A;
      the at least one processor computes a product of the eigenvector $\Lambda$ and a vector whose elements are the signals received by the receiving antennas;
      the at least one processor computes inner products of each row of the A matrix and the eigenvector $\Lambda$; and
      the maximum likelihood detector detects transmitted symbols in from the received signals utilizing the computed inner products.

5. An apparatus for receiving encoded symbols from multiple transmitting antennas under a wireless communication system, the apparatus comprising:
   one or more electronic circuits, wherein the electronic circuits include:
      an input portion to receive input signals from each one of multiple receiving antennas, wherein a transfer function is associated with each transmitting antenna-receiving antenna pair;
      a first signal processing section for generating multiple transfer function values representing channels over which the input signals are received, wherein each transfer function is associated with a transmitting-receiving antenna pair associated with the received encoded symbols;
      a second signal processing section for generating multiple combined transfer function values generated from combining the transfer functions such that a number of decoding computations is reduced;
      a multiplier for multiplying the received input signals with a respective combined transfer function value;
      an adder coupled to the multiplier for adding the multiplied signals; and
      an output portion for outputting the added signals for decoding.

6. The apparatus of claim 5, wherein the second signal processing section generates multiple combined transfer function values by developing a matrix from the transfer function values, finding eigenvalues of the matrix, creating a maximum eigenvector of the matrix, and generating a subset of values from a set of all possible values of received encoded symbols from the maximum eigenvector.

7. The apparatus of claim 5, wherein the input signals include transmitted codewords, wherein the multiple transmitting antennas transmit the encoded symbols in blocks of multiple time frames, and wherein a codeword comprises all encoded symbols transmitted within a time frame.

8. The apparatus of claim 5, wherein the input signals include transmitted codewords, wherein the multiple transmitting antennas transmit the encoded symbols in blocks of multiple time frames, and, wherein a codeword comprises $c^1{}_1{}^2 c_1{}^3 \ldots c_1{}^4 c_2{}^1 c_2{}^2 c_2{}^3 \ldots c_2{}^4 c_3{}^1 c_3{}^2 c_3{}^3 \ldots c_3{}^4 \ldots c^{m1} c_m{}^2 c_m{}^3 \ldots c_m{}^4$.

9. The apparatus of claim 5, further comprising a decoding circuit coupled to the output portion, wherein the decoding circuit is configured to compute a subset from a set of all possible values of codewords associated with the input signals and by employing the added signals and the combined transfer function values.

10. The apparatus of claim 5, further comprising a decoding circuit coupled to the output portion and configured to compute a subset from a set of all possible values of codewords associated with the input signals, wherein the combined transfer function values are designated $$\gamma_i = \sum_{j=1}^{m} \lambda_j \alpha_{ij},$$

and wherein the decoding circuit computes a subset from a set of all possible values by minimizing $$\sum_{t=1}^{L} \left| R_t - \sum_{i=1}^{n} \gamma_i c_t^i \right|^2$$

from among all possible codewords.

11. The apparatus of claim 5, further comprising a maximum likelihood detector coupled to the output portion.

12. A method of processing wirelessly transmitted data, wherein the data is transmitted from multiple transmitting antennas and is received by multiple receiving antennas, the method comprising:
   receiving transmitted signals from the transmitting antennas by the receiving antennas;
   determining channel behaviors, utilizing the received signals, wherein each channel behavior represents an effect of one particular transmission path, from one of the transmitting antennas to one of the receiving antennas, on the received signal;
   computing a weight factor for each receiving antenna based on a combination of all channel behaviors;
   computing receiver factors based on the received signals and transmission paths from the transmitting antennas to the receiving antennas;
   computing a transmitter factor related to each transmitting antenna based on the computed receiver factors and the channel behaviors of paths between the particular transmitting antenna and all the receiving antennas; and
   detecting transmitted symbols from the received signals, utilizing the transmitter factors, the weight factors, and a summation of the received signals, and based on statistics or probability properties.

13. The method of claim 12, wherein the processing includes computing eigenvectors based on the m number of receiving antennas.

14. The method of claim 12, wherein the wireless signal is transmitted by multiple transmitting antennas, and the wireless signal is encoded under a space-time modulation scheme.

15. An apparatus for processing wirelessly transmitted data, wherein the data is transmitted from multiple transmitting antennas and is received by multiple receiving antennas, the apparatus comprising:

means for receiving transmitted signals from the transmitting antennas by the receiving antennas;

means for determining channel behaviors, utilizing the received signals, wherein each channel behavior represents an effect of one particular transmission path, from one of the transmitting antennas to one of the receiving antennas, on the received signal;

means for computing a weight factor for each receiving antenna based on a combination of all channel behaviors;

means for computing receiver factors based on the received signals and transmission oaths from the transmitting antennas to the receiving antennas;

means for computing a transmitter factor related to each transmitting antenna based on the computed receiver factors and the channel behaviors of paths between the particular transmitting antenna and all the receiving antennas; and means for detecting transmitted symbols from the received signals, utilizing the transmitter factors, the weight factors, and a summation of the received signals, and based on statistics or probability properties.

16. The apparatus of claim 15, wherein the processing includes computing eigenvectors based on the m number of receiving antennas.

17. The apparatus of claim 15, wherein the wireless signal is transmitted by multiple transmitting antennas, and the wireless signal is encoded under a space-time modulation scheme.

\* \* \* \* \*

UNITED STATES PATENT AND TRADEMARK OFFICE
CERTIFICATE OF CORRECTION

| | | |
|---|---|---|
| PATENT NO. | : 7,046,737 B2 | Page 1 of 1 |
| APPLICATION NO. | : 10/838553 | |
| DATED | : May 16, 2006 | |
| INVENTOR(S) | : Titus Lo and Vahid Tarokh | |

It is certified that error appears in the above-identified patent and that said Letters Patent is hereby corrected as shown below:

Column 6, Line 11, Claim 8, delete "$c_m^{\;4}$,." and insert therefor -- $c_m^4$. -- (PTO error)

Signed and Sealed this

Twelfth Day of September, 2006

JON W. DUDAS
*Director of the United States Patent and Trademark Office*